United States Patent
Hsu et al.

(10) Patent No.: US 12,319,448 B1
(45) Date of Patent: Jun. 3, 2025

(54) UNMANNED AERIAL VEHICLE POWERED USING ELECTRIC PROPULSION

(71) Applicant: Honda Motor Co., Ltd., Tokyo (JP)

(72) Inventors: Ricky Jukuei Hsu, Rancho Palos Verdes, CA (US); Jean-Hugues Tuan Huy Nguyen, Los Angeles, CA (US); Franco Corral, Los Angeles, CA (US); Romain Daniel Charles Mivelle, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 18/443,110

(22) Filed: Feb. 15, 2024

(51) Int. Cl.
  *B64U 50/16* (2023.01)
  *B64U 30/20* (2023.01)

(52) U.S. Cl.
  CPC ............ *B64U 30/20* (2023.01); *B64U 50/16* (2023.01)

(58) Field of Classification Search
  CPC ..................................................... B64U 50/16
  See application file for complete search history.

(56) References Cited

U.S. PATENT DOCUMENTS

| 8,091,836 | B2 | 1/2012 | Minick |
| 11,667,372 | B2 | 6/2023 | Krasnoff |
| 2011/0000185 | A1 | 1/2011 | Gochnour |
| 2019/0246482 | A1* | 8/2019 | Zimmerman ..... H01J 37/32568 |
| 2020/0265983 | A1* | 8/2020 | Daniel ................. H01F 7/0221 |
| 2023/0074750 | A1* | 3/2023 | Muller .................... F01D 17/02 |
| 2023/0382524 | A1* | 11/2023 | Brookes ............. B64C 29/0025 |

FOREIGN PATENT DOCUMENTS

| CN | 1836974 | A | 9/2006 | |
| CN | 116215904 | A | 6/2023 | |
| CN | 116692058 | A | 9/2023 | |
| DE | 2529684 | A1 | 1/1977 | |
| EP | 2613050 | A2 * | 7/2013 | ............. B64C 39/02 |
| FR | 2159158 | A1 | 6/1973 | |
| KR | 102222496 | B1 | 3/2021 | |
| KR | 20220055377 | A | 5/2022 | |
| KR | 20230064494 | A | 5/2023 | |
| RO | 132916 | | 11/2018 | |
| WO | WO-2022119913 | A1 * | 6/2022 | ............. B60L 53/14 |
| WO | 2023282856 | A2 | 1/2023 | |

* cited by examiner

*Primary Examiner* — Christopher P Ellis
(74) *Attorney, Agent, or Firm* — Joslyn Garcia; American Honda Motor Co., Inc.

(57) ABSTRACT

An unmanned aerial vehicle (UAV) powered using electric propulsion is provided. The unmanned aerial vehicle (UAV) includes a main frame and a plurality of thrust rings. The plurality of thrust rings is arranged in a first spatial configuration around the main frame and is rotatably coupled to at least one actuator in the main frame along a pivot axis. The unmanned aerial vehicle (UAV) further includes a plurality of plasma actuators disposed on at least one of the plurality of thrust rings. Further, in an actuated state, the plurality of plasma actuators actuates to generate a plasma thrust that causes the unmanned aerial vehicle (UAV) to orient along a particular axis or move in a specific direction.

20 Claims, 6 Drawing Sheets

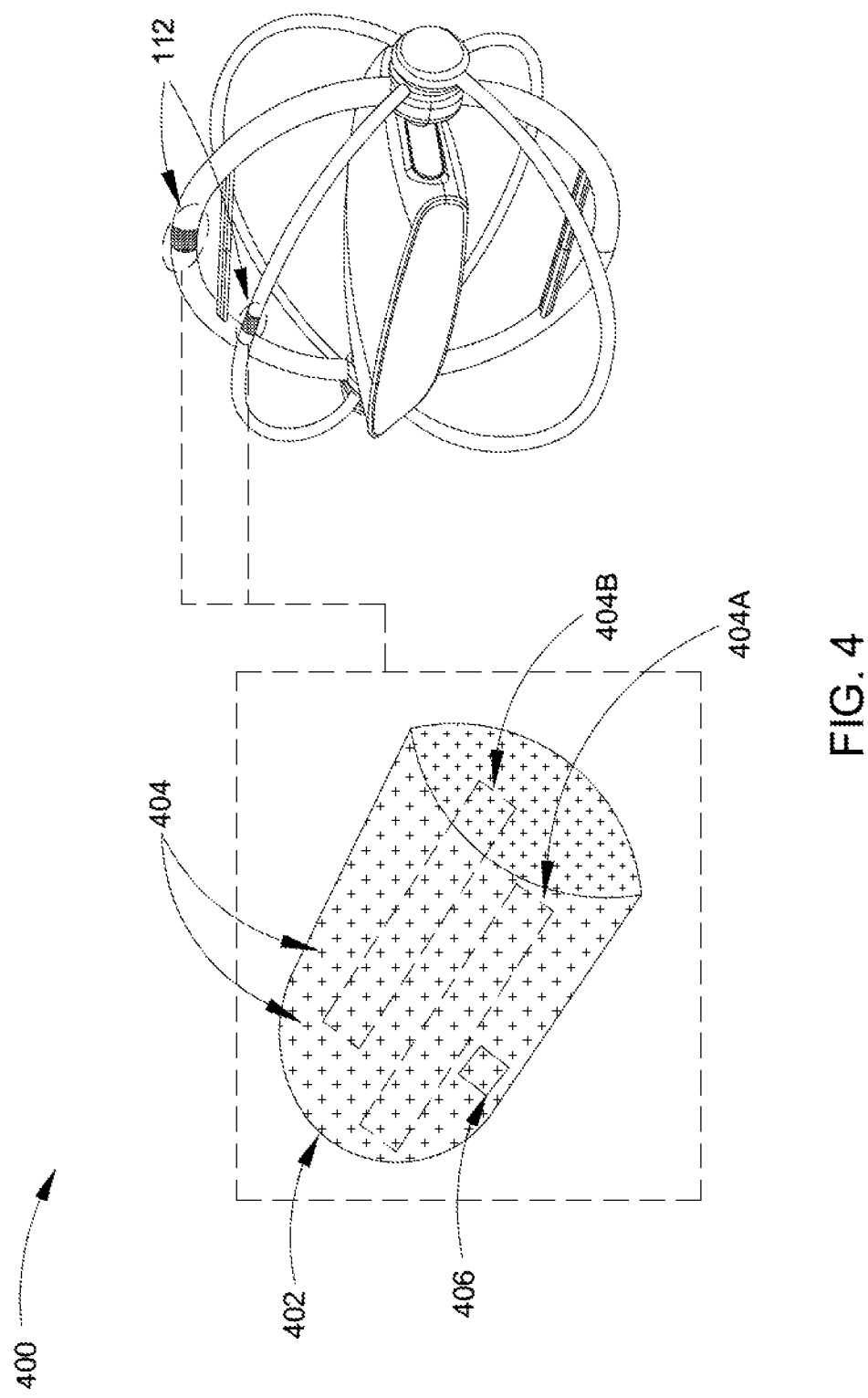

UNMANNED AERIAL VEHICLE POWERED USING ELECTRIC PROPULSION

BACKGROUND

Aerial Vehicles, particularly unmanned ones, have a wide range of applications, including but not limited to military, delivery, image, and video recording, medical, search and rescue, wireless communication, aerial surveillance and monitoring, and hidden area exploration. However, such vehicles have several limitations in terms of design and deployment, including, but not limited to, battery endurance, mobility, flight time, noise, and trained manpower. Conventionally, aerial vehicles, especially Unmanned Aerial Vehicles (UAVs) use a fixed-wing, a single rotor, a fixed-wing hybrid, or a multirotor rotor-based design. However, there are several issues related to such a design. For instance, such UAVs require a special training to control, making them less accessible for general use and are also not suitable for aerial surveillance as they are incapable of hovering or forward flight. Single-rotor UAVs, in particular, may be mechanically complex and susceptible to obstacles such as vibrations. These UAVs are designed for specific operations and face different aerodynamic challenges. In terms of multi-rotor UAVs, while they are more stable, they are complex to model and control. Furthermore, the noise produced by these UAVs is a significant concern. Acoustic measurements taken on isolated rotor-airframe configurations representative of small-scale, rotary-wing unmanned aircraft systems (UAS) indicate that noise control is a significant challenge. Such issues highlight the need for more efficient, user-friendly, and quieter UAV designs.

Limitations and disadvantages of conventional and traditional approaches will become apparent to one of skill in the art, through comparison of described systems with few aspects of the present disclosure, as set forth in the remainder of the present application and with reference to the drawings.

SUMMARY

According to an embodiment of the disclosure, an unmanned aerial vehicle (UAV) may be provided that may be powered using electric propulsion. The unmanned aerial vehicle (UAV) may include a main frame and a plurality of thrust rings. The plurality of thrust rings may be arranged in a first spatial configuration around the main frame and may be rotatably coupled to at least one actuator in the main frame along a pivot axis. The unmanned aerial vehicle (UAV) may further include a plurality of plasma actuators that may be disposed on at least one of the plurality of thrust rings. Further, in an actuated state, the plurality of plasma actuators may be actuated to generate a plasma thrust that causes the unmanned aerial vehicle (UAV) to orient along a particular axis or move in a specific direction.

According to another embodiment of the disclosure, a control system for an unmanned aerial vehicle (UAV) may be provided. The control system may include a first electronic controller that may be communicatively coupled to a plurality of plasma actuators disposed on at least one of a plurality of thrust rings. The plurality of thrust rings may be arranged in a first spatial configuration around a main frame of the UAV. The control system may further include a second electronic controller that may be communicatively coupled to at least one actuator disposed in the main frame and may be rotatably coupled to the plurality of thrust rings. The control system may further include a processor that may receive an input and control, based on the input, an actuation of the plurality of plasma actuators, that may be configured to generate a plasma thrust that may cause the UAV to orient along a particular axis or move in a specific direction.

According to another embodiment of the disclosure, a method of assembling an Unmanned Aerial Vehicle may be provided. The method may include disposing a main frame that may include at least one actuator. The method may further include arranging a plurality of thrust rings in a first spatial configuration around the main frame such that the plurality of thrust rings may be rotatably coupled to the at least one actuator in the main frame along a pivot axis. The method may further include disposing a plurality of plasma actuators on at least one of the plurality of thrust rings.

BRIEF DESCRIPTION OF THE DRAWINGS

FIG. 4 is a diagram that illustrates structure of a plasma actuator of a plurality of plasma actuators disposed on a plurality of thrust rings, in accordance with an embodiment of the disclosure.

Figure 1:
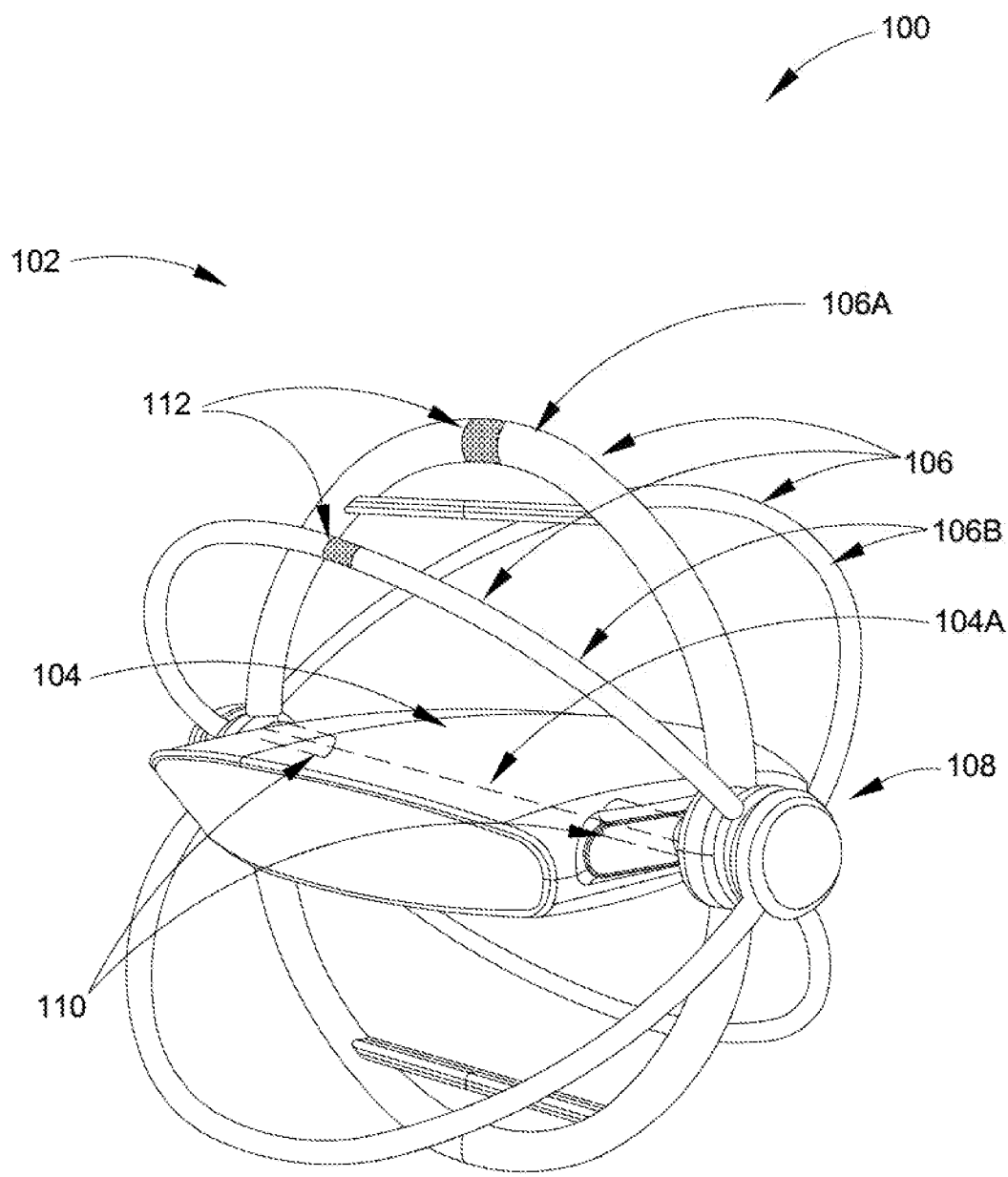
FIG. 1 is a diagram that illustrates an unmanned aerial vehicle (UAV) powered using electric propulsion, in accordance with an embodiment of the disclosure.

The foregoing summary, as well as the following detailed description of the present disclosure, is better understood when read in conjunction with the appended drawings. To illustrate the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

Various embodiments of the present disclosure may be found in an unmanned aerial vehicle (UAV). The disclosed unmanned aerial vehicle (UAV) may include a main frame, and a plurality of thrust rings that may circumscribe the main frame. The plurality of thrust rings may be arranged in a first spatial configuration around the main frame. The plurality of thrust rings may be rotatably coupled to at least one actuator in the main frame along a pivot axis. The at least one actuator may be configured to position each thrust ring of the plurality of thrust rings in the first spatial configuration. Further, each thrust ring of the plurality of thrust rings may rotate independent with each other. The unmanned aerial vehicle (UAV) may further include a plurality of plasma actuators disposed on at least one of the plurality of thrust rings. Further, the plurality of plasma actuators, in an actuated state, may be actuated to generate a plasma thrust that causes the UAV to orient along a particular axis or move in a specific direction.

Traditionally, an unmanned aerial vehicle (UAV) with rotors or wings powered by a battery can cause a variety of problems. For example, a shorter flight time due to the battery's limited capacity can reduce mobility, necessitating frequent charging. Second, the orientation of the rotor or wing-based UAV is determined by the operator's skill, and a lack of skilled manpower can affect the UAV's orientation, resulting in its collapse. Finally, because of the rotors or wings, the UAV produces noise, which may jeopardize hidden surveillance.

To overcome some of the abovementioned issues, the proposed unmanned aerial vehicle (UAV) includes a ring structure that circumscribes main body of the UAV. The ring structure may include plurality of thrust rings, where each thrust ring rotates independently to form a spatial configuration. The spatial configuration orients the UAV along a particular axis. Moreover, there are several benefits related to the ring structure of the proposed UAV. For instance, the ring structure quickly orients in the spatial configuration using actuators, resulting in high maneuverability of the UAV. The structure includes plasma actuators that may generate a plasma thrust to propel the UAV in a specific direction. The actuation of the plasma actuators may control a pattern of release or collection of corona discharge to provide a direction to plasma thrust that orient or move the UAV in a specific direction. Further, the actuation of the plasma actuators limits noise generation, making such UAVs more reliable for hidden surveillance. The capability of the proposed unmanned aerial vehicle (UAV) to orient or move in specific direction makes it autonomous requiring minimal manpower and generation of plasma thrust ensures more flight time.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates an unmanned aerial vehicle (UAV) powered using electric propulsion, in accordance with an embodiment of the disclosure. With reference to the FIG. 1, there is shown a diagram of an unmanned aerial vehicle (UAV) 102. The UAV 102 includes a main frame 104 having a pivot axis 104A, and a plurality of thrust rings 106 arranged in a first spatial configuration 108. The plurality of thrust rings 106 may include a dominant thrust ring 106A and minor thrust rings 106B. The UAV 102 may further include at least one actuator 110 in the main frame 104, and a plurality of plasma actuators 112 disposed on the plurality of thrust rings 106.

The UAV 102 may be an autonomous vehicle or a semi-autonomous vehicle that may be remotely controlled using radio or light signals, via at least one remote device. Examples of the UAV 102 may include, but are not limited to, a single-ring UAV, a three-rings UAV, a multi-ring UAV, or a hybrid UAV that uses one or more distinct renewable or non-renewable power sources. The UAV 102 may use electric propulsion as a power source to propel in a specific direction. Additionally, or alternatively, the UAV 102 may use other power sources such as, but not limited to, a solar power, a battery, and/or other forms of alternative energy sources. It should be noted here that the UAV 102 shown in FIG. 1 may be associated to a three-ring UAV using the electric propulsion, which is merely an example. The present disclosure may be applicable to other types of UAV 102 (for example, a single-ring UAV, a multi-ring UAV, or a hybrid UAV, and the like). The description of such types of the UAV 102 has been omitted from the disclosure for the sake of brevity. The UAV 102 may include the main frame 104 and the plurality of thrust rings 106.

The main frame 104 of the UAV 102 may be a main support structure of the UAV 102 which may be configured to assemble a plurality of components associated with the UAV 102. The main frame 104 may be a load-bearing framework of the UAV 102 which structurally supports a plurality of UAV systems, such as, but not limited to, actuators, or a flight control system. By way of an example, and not limitation, the main frame 104 of the UAV 102 may include a plurality of components, such as, but not limited, a processor, a battery, at least one actuator, or a plurality of rings. The present disclosure may be applicable to the main frame 104 of other types of the UAV 102 (for example, a single-ring UAV, a multi-ring UAV, or a hybrid UAV, and the like). The description of such types of the main frame 104 has been omitted from the disclosure for the sake of brevity.

The plurality of thrust rings 106 may be arranged in the first spatial configuration 108 around the main frame 104. The arrangement of the plurality of thrust rings 106 may be configured to orient the UAV 102 in a specific direction. The plurality of thrust rings 106 is shown to have a substantially circular shape, as shown in FIG. 1. The shape of each of the plurality of thrust rings 106 may depend on a shape of the main frame 104. The plurality of thrust rings 106 may also be formed to have various other shapes (for example, a substantially square shape, a substantially semi-circular shape, a substantially elliptical shape, and the like). By way of example, and not limitation, the plurality of thrust rings 106 may have a solid cross section. By way of another example, and not limitation, the plurality of thrust rings 106 may have a hollow cross section.

The plurality of thrust rings 106 may further include the dominant thrust ring 106A and minor thrust rings 106B. The dominant thrust ring 106A and minor thrust rings 106B may be configured to direct plasma thrust to orient or move the UAV 102 in a specific direction. By way of example, and not limitation, the dominant thrust ring 106A may be configured to release corona discharge and the minor thrust ring 106B may be configured to collect corona discharge. By way of another example, and not limitation, the minor thrust rings 106B may be configured to release corona discharge and the dominant thrust ring 106A may be configured to collect corona discharge.

The plurality of thrust rings 106 may be arranged around the main frame 104 in the first spatial configuration 108 and rotatably coupled to the at least one actuator 110 along the pivot axis 104A. In at least one embodiment, each thrust ring may circumscribe the main frame 104 and may rotate independent to each other along the pivot axis 104A. The rotation of each thrust ring may be used to direct the thrust vector associated with plasma thrust generated by the plurality of plasma actuators 112.

Figure 3A:
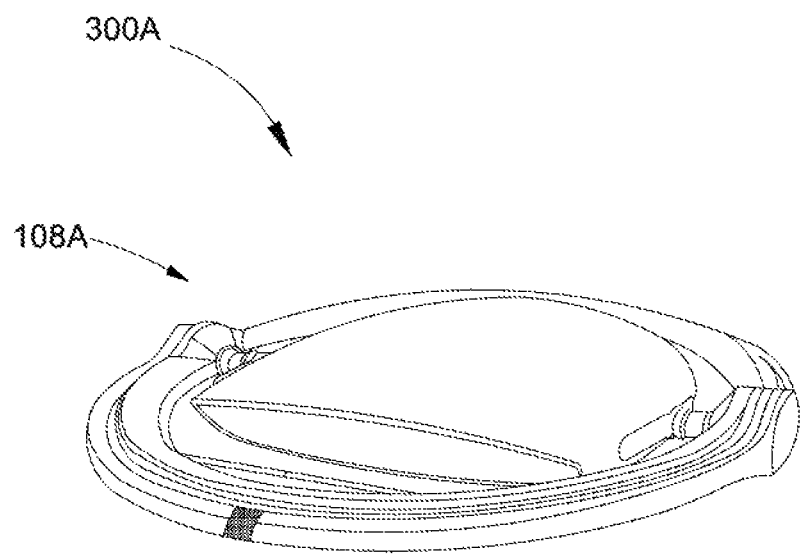
FIGS. 3A and 3B are scenario diagrams that collectively illustrate a type of spatial configuration of a plurality of thrust rings associated with an unmanned aerial vehicle (UAV), in accordance with an embodiment of the disclosure.
Figure 3B:
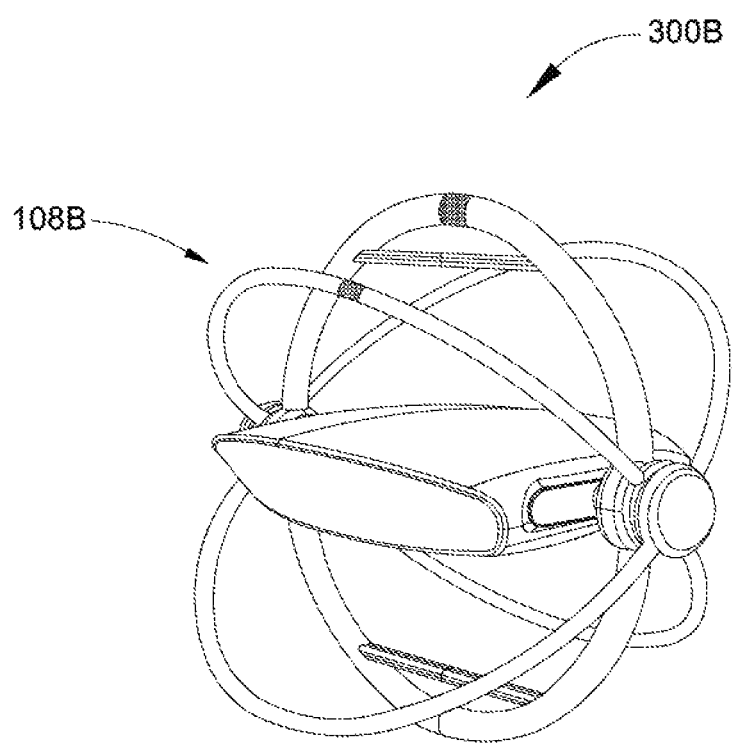

The first spatial configuration 108 of the plurality of thrust rings 106 may correspond to one of a stowed state and an actuated state, which is described in detail, for example, in FIGS. 3A and 3B. The first spatial configuration 108 may include each thrust ring having a particular relative orientation in terms of roll, yaw, or pitch angles with another thrust ring or the main frame 104 as a reference. For example, in the stowed state, the first spatial configuration may be a default configuration in which each thrust ring of the plurality of thrust rings 106 is concentrically aligned along the pivot axis 104A substantially parallel to a base section 208 of the main frame 104. Similarly, in the actuated state, the first spatial configuration includes each thrust ring of the plurality of thrust rings 106 positioned substantially at an acute angle with each other.

The at least one actuator 110 may include suitable logic, circuitry, interfaces, and/or code that may be configured to rotate each thrust ring of the plurality of thrust rings 106 about the pivot axis 104A. The at least one actuator 110 may achieve a physical movement by converting energy, often electric, air, or hydraulic into a mechanical force. The at least one actuator 110 may require a control signal, such as, but not limited to, an electric voltage, a pneumatic pressure, or a hydraulic fluid pressure. Based on the control signal, the at least one actuator 110 may be configured to rotate and arrange each thrust ring of the plurality of thrust rings 106 in the first spatial configuration 108 to direct the plasma thrust in a specific direction. Additionally, or alternatively, the rotation of the plurality of thrust rings 106 may be exemplified by rotary motors.

The plurality of plasma actuators 112 may include a set of mechanical and electrical components that may be configured to generate the plasma thrust to propel or move the UAV 102 in a specific direction. By way of example, and not limitation the plurality of plasma actuators 112 may be configured to impart force like an ionocraft.

The plurality of plasma actuators 112 may include a pair of asymmetric electrodes that may generate a low-temperature plasma by application of a high-voltage AC signal across the electrodes. Thereafter, air molecules from surroundings of the electrodes may be ionized and accelerated through electric field. Further, the plurality of plasma actuators 112 may be configured to generate the plasma thrust that causes the UAV 102 to orient along a particular axis or move in a specific direction. The plurality of plasma actuators 112 may be disposed on at least one of the plurality of thrust rings 106. By way of example, and not limitation, at least one actuator of the plurality of plasma actuators 112 may be disposed on each thrust ring of the plurality of thrust rings 106. Additionally, or alternatively, each plasma actuator of the plurality of plasma actuators 112 may be disposed on a thrust ring such that the plasma actuator is equidistant from other thrust rings and/or from pivot points on the main frame 104 along the pivot axis 104A.

In operation, the UAV 102 may be activated based on a human input, a control signal that may be received from a remote controller, or a microcontroller in the UAV 102 that autonomously executes computer-executable instructions stored on a control system in the UAV 102. As an example, a human operator may throw the UAV 102 in air, which may activate the UAV 102. During activation, the spatial configuration of the plurality of thrust rings 106 of the UAV 102 may change from a default stowed state (i.e., a stowed spatial configuration) to an actuated state. Further, in the actuated state, the plurality of plasma actuators 112 may be actuated to generate plasma thrust that may cause the UAV 102 to orient along a particular axis and/or move in a specific direction. Based on actuation of the plurality of plasma actuators 112, one section of at least one plasma actuator of the plurality of plasma actuators 112 may be configured to release corona discharge, and a second section of at least one plasma actuator of the plurality of plasma actuators 112 may be configured to collect the corona discharge, as explained in detail, for example in FIG. 4.

The actuation of at least one plasma actuator of the plurality of plasma actuators 112 may control a direction of movement of the UAV 102, along a particular axis, based on a direction of release or collection of the corona discharge.

By way of example, and not limitation, the plurality of plasma actuators 112 may release or collect the corona discharge in a direction substantially perpendicular to a ground surface, to provide a movement to the UAV 102 in the vertical direction. By way of another example, and not limitation, the plurality of plasma actuators 112 may release or collect the corona discharge in a direction substantially parallel to a ground surface, to provide the movement to the UAV 102 in the horizontal direction. Further implementation of the actuation of the plurality of plasma actuators 112 to generate the plasma thrust to orient or move the UAV 102 in a specific direction is explained in detail, for example, in FIG. 4.

Figure 2:
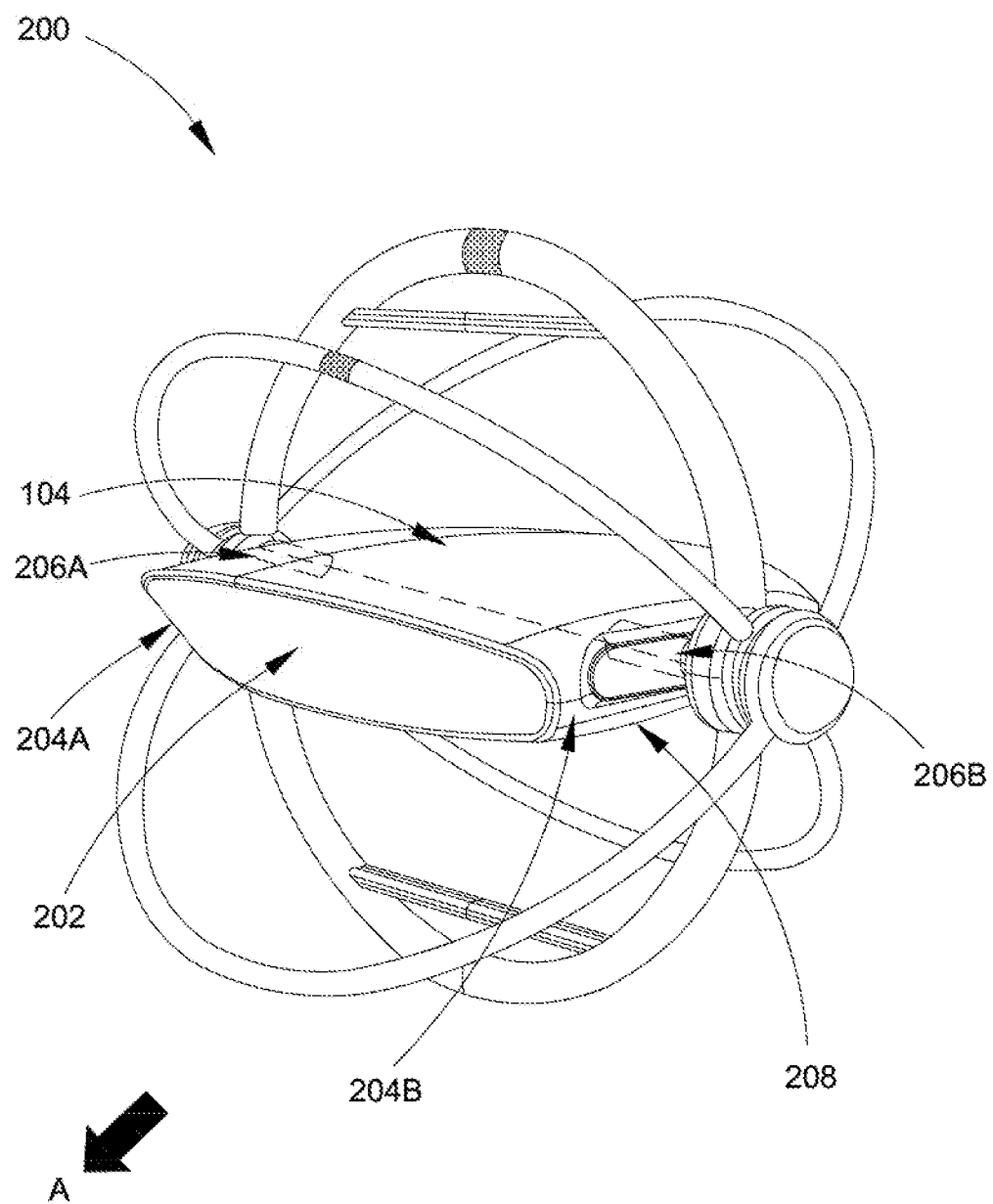
FIG. 2 is a diagram that illustrates sections of a main frame and attachment of a plurality of thrust rings associated with an unmanned aerial vehicle (UAV), in accordance with an embodiment of the disclosure.

FIG. 2 is a diagram that illustrates sections of a main frame and attachment of a plurality of thrust rings associated with an unmanned aerial vehicle (UAV), in accordance with an embodiment of the disclosure. FIG. 2 is explained in conjunction with elements from FIG. 1. With reference to the FIG. 2, there is shown a diagram 200 that may include a direction of movement of the UAV 102, the main frame 104, and the plurality of thrust rings 106. The main frame 104 may include a front section 202, a first side section 204A, and a second side section 204B, and a base section 208. The plurality of thrust rings 106 may include a first position 206A and a second position 206B.

The front section 202 of the main frame 104 may substantially face towards a direction of movement "A" of the UAV 102. It should be noted here that the direction of movement of the UAV 102, as shown in FIG. 2, is merely an example. The first side section 204A and the second side section 204B of the main frame 104 may be associated to either of a left side or a right side of the main frame 104 along a length of the main frame 104. The first side section 204A, as shown in FIG. 2, may be the right side of the main frame 104 with respect to the direction of movement of the UAV 102. Further, the second side section 204B, as shown in FIG. 2, may be the left side of the main frame 104 with respect to the direction of movement of the UAV 102. The base section 208 of the main frame 104 may be associated to a bottom side of the main frame 104, which is substantially perpendicular to the front section 202.

The first side section 204A may include a first shaft of the at least one actuator 110 and the second side section 204B may include a second shaft of the at least one actuator 110. By way of example, and not limitation, the first shaft and the second shaft may be separate shafts of a common actuator in case the actuator (i.e., the at least one actuator 110) is a dual shaft actuator. Alternatively, the main frame 104 may include a first actuator having the first shaft and a second actuator having the second shaft.

Further, each thrust ring of the plurality of thrust rings 106 may be rotatably coupled to the first shaft at a first position 206A of the plurality of thrust rings 106 and the second shaft at a second position 206B of the plurality of thrust rings 106. The second position 206B of the plurality of thrust rings 106 may be diametrically opposite to the first position 206A of the plurality of thrust rings 106. The first position 206A may be associated with the first side section 204A of the main frame 104 and the second position 206B may be associated with the second side section 204B of the main frame 104. It should be noted here that the first position 206A and the second position 206B, as shown in FIG. 2, are merely example positions.

FIGS. 3A and 3B are scenario diagrams that collectively illustrate spatial configurations of a plurality of thrust rings associated with an unmanned aerial vehicle (UAV), in accordance with an embodiment of the disclosure. FIGS. 3A and 3B are explained in conjunction with elements from FIG. 1 and FIG. 2. With reference to the FIG. 3A, there is shown a scenario diagram 300A that illustrates the first spatial configuration 108 in a stowed state 108A. With reference to the FIG. 3B, there is shown a scenario diagram 300B that illustrates the first spatial configuration 108 in the actuated state 108B.

In the stowed state 108A, the first spatial configuration 108 may be a default configuration. In the default configuration, each thrust ring of the plurality of thrust rings 106 may be concentrically aligned along the pivot axis 104A substantially parallel to the base section 208 of the main frame 104. By way of example, and not limitation, the plurality of thrust rings 106 may be in the default configuration in case the UAV 102 is not in operation or in an inactive state. By way of another example, and not limitation, the plurality of thrust rings 106 may be in the default configuration in case the UAV 102 is stored.

In the actuated state 108B, the first spatial configuration 108 may include each thrust ring of the plurality of thrust rings 106 positioned substantially at an acute angle with each other. The at least one actuator 110 may be configured to rotate the plurality of thrust rings 106 from the stowed state 108A to position each thrust ring of the plurality of thrust rings 106 substantially at an acute angle with each other in the actuated state 108B. By way of example, and not limitation, each thrust ring of the plurality of thrust rings 106 may be positioned substantially at an angle of 45 degrees with each other in case the UAV 102 is in operation.

It should be noted that the scenario diagrams 300A and 300B of FIGS. 3A and 3B, are for exemplary purposes and should not be construed to limit the scope of the disclosure.

FIG. 4 is a diagram that illustrates structure of a plasma actuator of a plurality of plasma actuators disposed on a plurality of thrust rings, in accordance with an embodiment of the disclosure. FIG. 4 is explained in conjunction with elements from FIG. 1, FIG. 2, and FIGS. 3A and 3B. With reference to FIG. 4, there is shown a structural diagram 400 that includes a plasma actuator of the plurality of plasma actuators 112 that may be disposed on at least one of the plurality of thrust rings 106. Each plasma actuator of the plurality of plasma actuators 112 may have a substantially cylindrical structure 402 having a plurality of openings 404 arranged in a Dot Matrix Pattern 406. The plurality of openings 404 may further include a first portion 404A and a second portion 404B.

The cylindrical structure 402 may have a substantially circular cross section that may allow a perfect fit between each plasma actuator of the plurality of plasma actuators 112 with each thrust ring of the plurality of thrust rings 106. The cylindrical structure 402 of each plasma actuator of the plurality of plasma actuators 112 may have a cross section similar to the cross section of at least one thrust ring of the plurality of thrust rings 106. By way of example, and not limitation, the cylindrical structure 402 may have a hollow cross section, in case cross section of the plurality of thrust rings 106 is hollow. Alternatively, the cylindrical structure 402 may have a solid cross section in case cross section of the plurality of thrust rings 106 is solid. The cylindrical structure 402 may further include the plurality of openings 404 that may be spread across a surface of the substantially cylindrical structure 402.

The plurality of openings 404 may have a substantially circular shape or may be formed with various shapes (for example, a substantially square shape, a substantially rectangular shape, and the like). Further, each opening of the plurality of openings 404 may be spaced at an equal distance from each other and the dimension of each opening of the plurality of openings 404 may be same or different. The plurality of openings 404 may be spread in the Dot Matrix Pattern 406.

The Dot Matrix Pattern 406 may be a two-dimensional (2D) pattern array of the plurality of openings 404. In the Dot Matrix Pattern 406, each opening of the plurality of openings 404 may be configured to release or collect the corona discharge. Further, the plurality of openings 404 in the Dot Matrix Pattern 406 may have a first portion 404A and a second portion 404B. The first portion 404A of the plurality of openings 404 may be configured to release the corona discharge and the second portion 404B of the plurality of openings 404 may be configured to collect the released corona discharge.

The actuation of the plurality of plasma actuators 112 may be configured to control a pattern of at least one of a release of corona discharge via the first portion 404A of the plurality of openings 404 or a collection of the released corona discharge via the second portion 404B of the plurality of openings 404. Further, based on the pattern of at least one of the release or collection of the corona discharge in a specific direction, the UAV 102 may orient along the particular axis or move in the specific direction. The pattern of at least one of the release or collection of the corona discharge may be controlled by at least one of activating a section of the first portion 404A or deactivating other section of the second portion 404B of the plurality of openings 404. By way of example, and not limitation, the actuation of the plurality of plasma actuators 112 may control activation of a section of the first portion 404A to release corona discharge in a direction substantially parallel to a horizontal plane. Thereafter, based on release of corona discharge in the direction substantially parallel to the horizontal plane, the UAV 102 may move in the horizontal direction.

Furthermore, the orientation of the UAV 102 may be controlled based on a second spatial configuration of each thrust ring of the plurality of thrust rings 106 and a controlled pattern of at least one of the release or the collection of the corona discharge. The second spatial configuration may be same as or different from the first spatial configuration 108. The UAV 102 may be oriented in the particular direction based on a change in the position of each thrust ring of the plurality of thrust rings 106 to the second spatial configuration. The second spatial configuration may include each thrust ring of the plurality of thrust rings 106 positioned substantially at an acute angle with each other. In accordance with an embodiment, the acute angle in the second spatial configuration may be different from the acute angle in the first spatial configuration 108. For example, the value of the acute angle in the second spatial configuration may be 45 degrees and the value of the acute angle in the first spatial configuration 108 may be 60 degrees. Alternatively, the value of the acute angle in the second spatial configuration may be same as the value of the acute angle in the first spatial configuration 108. For example, the value of the acute angle in the second spatial configuration may be 60 degree which may be the same as the value of the acute angle in the first spatial configuration 108.

In an exemplary embodiment, the UAV 102 in the first spatial configuration 108 may be oriented in X direction. To orient the UAV 102 in the Y direction, the actuation of the plurality of plasma actuators 112 may control the pattern of at least the release of corona discharge or collection of the released corona discharge. Moreover, each thrust ring of the plurality of thrust rings 106 may be arranged in the second spatial configuration to orient the UAV 102 in the Y direction.

In accordance with an embodiment, the plurality of plasma actuators 112 may include a first plasma actuator that may be disposed across a section of a dominant thrust ring 106A of the plurality of thrust rings 106. The plurality of plasma actuators 112 may further include a group of plasma actuators that may be disposed across different sections of minor thrust rings 106B of the plurality of thrust rings 106. By way of example, and not limitation, the first plasma actuator of the dominant thrust ring may be configured to release the corona discharge and the group of plasma actuators of the minor thrust rings may be configured to collect the released corona discharge. Additionally, or alternatively, the group of plasma actuators of the minor thrust rings may be configured to release the corona discharge and the first plasma actuator of the dominant thrust ring may be configured to collect the released corona discharge.

It should be noted that the structural diagram 400 of FIG. 4, is for exemplary purposes and should not be construed to limit the scope of the disclosure.

Figure 5:
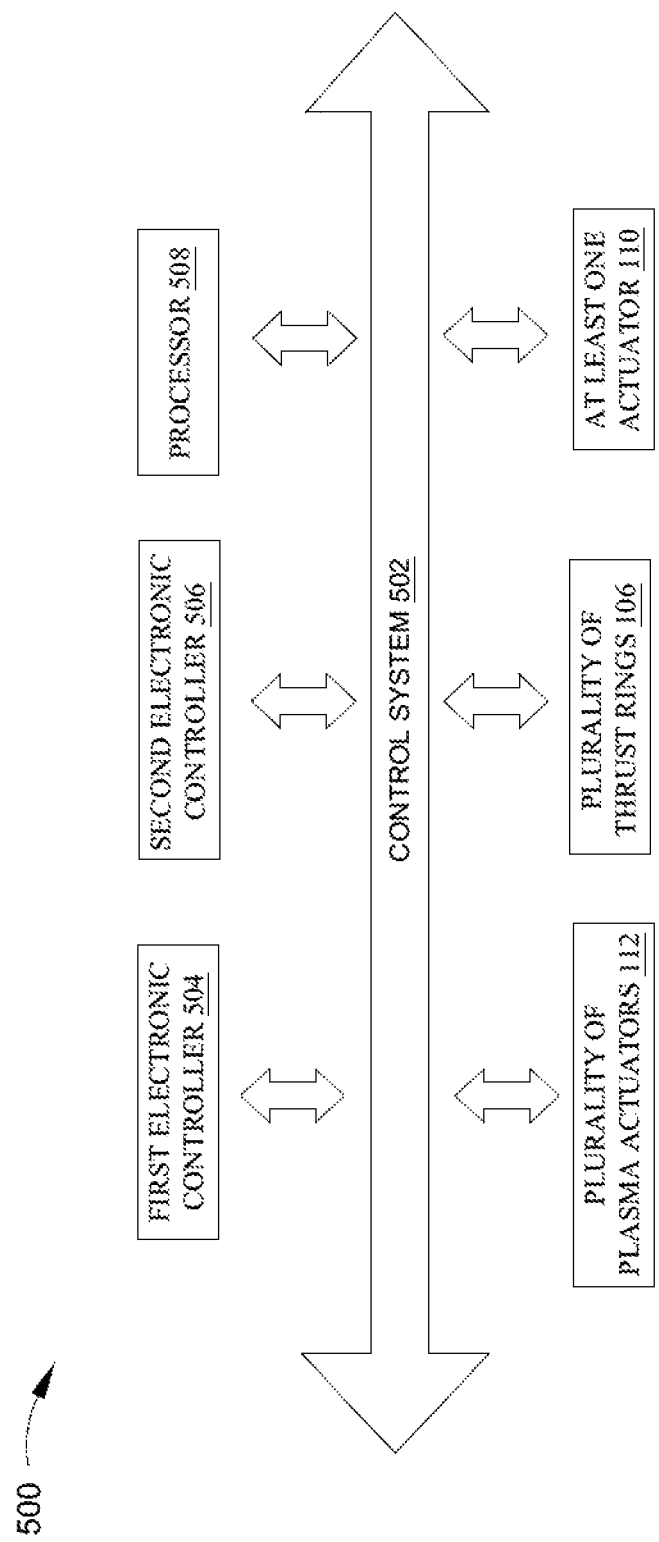
FIG. 5 is a block diagram that illustrates a control system for an unmanned aerial vehicle (UAV), in accordance with an embodiment of the disclosure.

FIG. 5 is a block diagram that illustrates a control system for an unmanned aerial vehicle (UAV), in accordance with an embodiment of the disclosure. FIG. 5 is explained in conjunction with elements from FIG. 1, FIG. 2, FIGS. 3A and 3B, and FIG. 4. With reference to FIG. 5, there is shown a block diagram 500 that includes a control system 502, a first electronic controller 504, a second electronic controller 506, and a processor 508.

The control system 502 may include circuitry and/or an interface through which the various control units, components, and/or systems of the UAV 102 may communicate with each other. In accordance with an embodiment, a communication of audio/video data within the UAV 102 may occur by use of Media Oriented Systems Transport (MOST) multimedia network protocol of the control system 502 or other network protocols for the UAV 102 communication. Various devices or components in the UAV 102 may connect to the control system 502, in accordance with various wireless communication protocols. The control system 502 may facilitate access control and/or communication between the first electronic controller 504, the second electronic controller 506, and the processor 508 with the components of the UAV 102, such as the plurality of plasma actuators 112 or the at least one actuator 110.

The first electronic controller 504 may include suitable logic, circuitry, and interfaces that may be configured to execute program instructions associated with different operations to be executed by the control system of the UAV 102. The first electronic controller 504 may be communicatively coupled to the plurality of plasma actuators 112 disposed on at least one of the plurality of thrust rings 106, which may be arranged in the first spatial configuration 108 around the main frame 104 of the UAV 102. The first electronic controller 504 may be configured to control the actuation of the plurality of plasma actuators 112. The first electronic controller 504 may include one or more specialized processing units, which may be implemented as a separate processor, an integrated processor or a cluster of processors that perform the functions of the one or more specialized processing units, collectively. The first electronic controller 504 may be implemented based on a number of processor technologies known in the art. Examples of implementations of the first electronic controller 504 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The second electronic controller 506 may include suitable logic, circuitry, and interfaces that may be configured to execute program instructions associated with different operations to be executed by the control system of the UAV 102. The second electronic controller 506 may be communicatively coupled to the at least one actuator 110 disposed in the main frame 104 and rotatably coupled to the plurality of thrust rings 106. For example, the operations of the second electronic controller 506 may include actuation of the at least one actuator 110 disposed in the main frame 104 to position the plurality of thrust rings 106 that control a thrust vector and movement (linear displacement and orientation) of the UAV 102. The second electronic controller 506 may include one or more specialized processing units, which may be implemented as a separate processor, an integrated processor, or a cluster of processors that perform the functions of the one or more specialized processing units, collectively. The second electronic controller 506 may be implemented based on a number of processor technologies known in the art. Examples of implementations of the second electronic controller 506 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The processor 508 may include suitable logic, circuitry, and interfaces that may be configured to execute a set of instructions associated with different operations to be executed by the control system of the UAV 102. For example, some of the operations may include a reception of input(s) and a controlled actuation of the plurality of plasma actuators 112 via the first electronic controller 504. The processor 508 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors. In accordance with an embodiment, the actuation of at least one of the first electronic controller 504 or the second electronic controller 506 may be controlled by the processor 508.

In operation, the control system 502 may be configured to control the activation of the first electronic controller 504, the second electronic controller 506, and the processor 508. The actuation of the plurality of plasma actuators 112 by the first electronic controller 504 may be configured to generate the plasma thrust that may cause the UAV 102 to orient along a particular axis or move in a specific direction, which is explained, in detail, for example in FIG. 1 and FIG. 4. Further, the actuation of the at least one actuator 110 by the second electronic controller 506, may be configured to position the plurality of thrust rings 106 in one of the first spatial configuration 108 or the second spatial configuration, which is explained, in detail, for example in FIG. 1, FIGS. 3A and 3B, and FIG. 4. Furthermore, the processor 508 may receive the input to control the actuation of the plurality of plasma actuators 112 that may further control pattern of at least one of the release of corona discharge or the collection of the released corona discharge, which is explained, in detail, for example in FIG. 1, and FIG. 4

It should be noted that the control system 502, as shown in block diagram 500 of FIG. 5, is for exemplary purposes and should not be construed to limit the scope of the disclosure.

Figure 6:
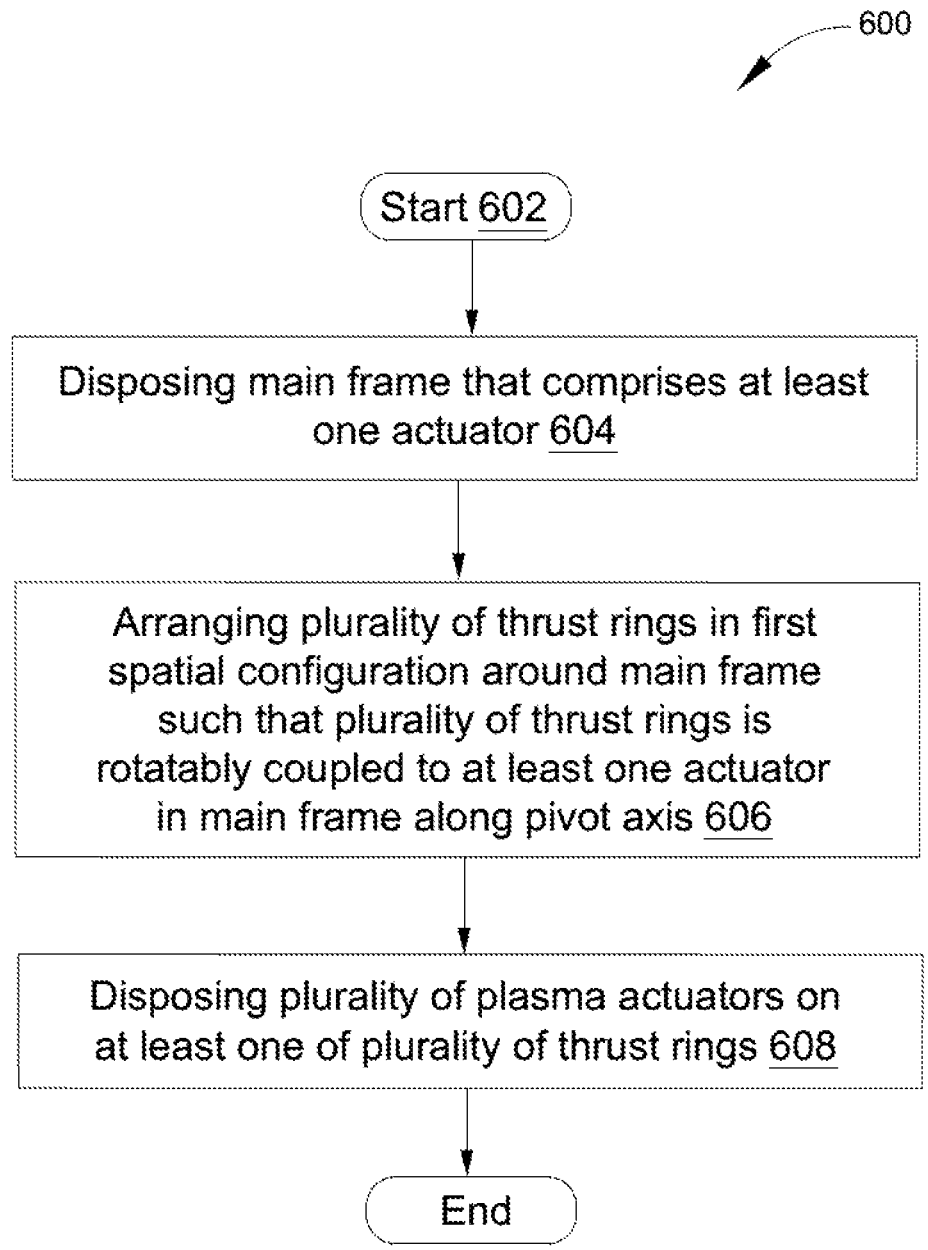
FIG. 6 is a flowchart that illustrates an exemplary method of assembling an unmanned aerial vehicle (UAV), in accordance with an embodiment of the disclosure.

FIG. 6 is a flowchart that illustrates an exemplary method of assembling an unmanned aerial vehicle (UAV), in accordance with an embodiment of the disclosure. FIG. 6 is explained in conjunction with elements from FIG. 1, FIG. 2, FIGS. 3A and 3B, FIG. 4 and FIG. 5. With reference to FIG. 6, there is shown a flowchart 600, which may depict method of assembling the UAV 102. The method illustrated in the flowchart 600 may start at 602 and proceed to 604.

At 604, the main frame 104 having the at least one actuator 110 may be disposed in the unmanned aerial vehicle (UAV). Further details regarding the main frame 104 and implementation of the at least one actuator 110 are described in detail, for example, in FIG. 1, FIG. 2, and FIG. 4.

At 606, the plurality of thrust rings 106 may be arranged in the first spatial configuration 108 around the main frame 104 such that the plurality of thrust rings 106 is rotatably coupled to the at least one actuator 110 in the main frame 104 along the pivot axis 104A. Further details regarding plurality of thrust rings 106 arranged in the first spatial configuration 108, type of first spatial configuration 108, and implementation of the at least one actuator 110 to rotate the plurality of thrust rings 106 along the pivot axis 104A is described, for example, in FIG. 1, FIG. 2, FIGS. 3A and 3B, and FIG. 4.

At 608, the plurality of plasma actuators 112 may be disposed on at least one of the plurality of thrust rings 106. Further implementation of the plurality of plasma actuators 112 to generate a plasma thrust that causes the UAV 102 to orient along a particular axis or move in a specific direction is described in detail, for example, in FIG. 1, and FIG. 4.

Although the flowchart 600 is illustrated as discrete operations, such as 602, 604, 606, and 608, the disclosure is not so limited. Accordingly, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe, and claim the present disclosure are intended to be construed in a non-exclusive manner, namely allowing for items, components or elements not explicitly described also, to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. An unmanned aerial vehicle (UAV), comprising:
a main frame;
a plurality of thrust rings that is arranged in a first spatial configuration around the main frame and rotatably coupled to at least one actuator in the main frame along a pivot axis; and
a plurality of plasma actuators disposed on at least one of the plurality of thrust rings,
wherein, in an actuated state, the plurality of plasma actuators is actuated to generate a plasma thrust that causes the UAV to orient along a particular axis or move in a specific direction.

2. The UAV according to claim 1, wherein the main frame comprises:
a front section,
a first side section that includes a first shaft of the at least one actuator,
a second side section that includes a second shaft of the at least one actuator,
wherein each thrust ring of the plurality of thrust rings is rotatably coupled to the first shaft at a first position of the plurality of thrust rings and the second shaft at a second position of the plurality of thrust rings, and wherein the second position is diametrically opposite to the first position.

3. The UAV according to claim 1, wherein the first spatial configuration corresponds to one of a stowed state or the actuated state.

4. The UAV according to claim 3, wherein, in the stowed state, the first spatial configuration is a default configuration in which each thrust ring of the plurality of thrust rings is concentrically aligned along the pivot axis substantially parallel to a base section of the main frame.

5. The UAV according to claim 1, wherein, in the actuated state, the first spatial configuration includes each thrust ring of the plurality of thrust rings positioned substantially at an acute angle with each other.

6. The UAV according to claim 1, wherein each thrust ring of the plurality of thrust rings circumscribes the main frame and rotates independent to each other along the pivot axis.

7. The UAV according to claim 1, wherein each plasma actuator of the plurality of plasma actuators is having a substantially cylindrical structure comprising a plurality of openings in a Dot Matrix Pattern, spread across a surface of the substantially cylindrical structure.

8. The UAV according to claim 7, wherein the actuation of the plurality of plasma actuators controls a pattern of at least one of a release of corona discharge via a first portion of the plurality of openings or a collection of the released corona discharge via a second portion of the plurality of openings.

9. The UAV according to claim 8, wherein an orientation of the UAV is controlled based on a second spatial configuration of each thrust ring of the plurality of thrust rings and the controlled pattern of at least one of the release or the collection of the corona discharge, and
the second spatial configuration is same as or different from the first spatial configuration.

10. The UAV according to claim 1, wherein the plurality of plasma actuators comprises:
a first plasma actuator disposed across a section of a dominant thrust ring of the plurality of thrust rings, and
a group of plasma actuators disposed across different sections of minor thrust rings of the plurality of thrust rings.

11. A control system for an unmanned aerial vehicle (UAV), comprising:
a first electronic controller communicatively coupled to a plurality of plasma actuators disposed on at least one of a plurality of thrust rings, which is arranged in a first spatial configuration around a main frame of the UAV;
a second electronic controller communicatively coupled to at least one actuator disposed in the main frame and rotatably coupled to the plurality of thrust rings; and
a processor that:
receives an input; and
controls, based on the input, an actuation of the plurality of plasma actuators generate a plasma thrust that causes the UAV to orient along a particular axis or move in a specific direction.

12. The control system according to claim 11, wherein each plasma actuator of the plurality of plasma actuators is having a substantially cylindrical structure comprising a plurality of openings in a Dot Matrix Pattern, spread across a surface of the substantially cylindrical structure.

13. The control system according to claim 12, wherein the actuation of the plurality of plasma actuators controls a pattern of at least one of a release of corona discharge via a first portion of the plurality of openings or a collection of the released corona discharge via a second portion of the plurality of openings.

14. The control system according to claim 13, wherein an orientation of the UAV is controlled based on a second spatial configuration of each thrust ring of the plurality of thrust rings and the controlled pattern of at least one of the release or the collection of the corona discharge, and the second spatial configuration is same as or different from the first spatial configuration.

15. The control system according to claim 11, wherein the first spatial configuration corresponds to one of a stowed state or an actuated state.

16. A method of assembling an unmanned aerial vehicle (UAV), comprising:
disposing a main frame that comprises at least one actuator;
arranging a plurality of thrust rings in a first spatial configuration around the main frame such that the plurality of thrust rings is rotatably coupled to the at least one actuator in the main frame along a pivot axis; and
disposing a plurality of plasma actuators on at least one of the plurality of thrust rings.

17. The method according to claim 16, wherein the first spatial configuration corresponds to one of a stowed state or an actuated state.

18. The method according to claim 16, wherein each plasma actuator of the plurality of plasma actuators is having a substantially cylindrical structure comprising a plurality of openings in a Dot Matrix Pattern, spread across a surface of the substantially cylindrical structure.

19. The method according to claim 18, wherein the actuation of the plurality of plasma actuators controls a pattern of at least one of a release of corona discharge via a first portion of the plurality of openings or a collection of the released corona discharge via a second portion of the plurality of openings.

20. The method according to claim 19, wherein an orientation of the UAV is controlled based on a second spatial configuration of each thrust ring of the plurality of thrust rings and the controlled pattern of at least one of the release or the collection of the corona discharge, and
the second spatial configuration is same as or different from the first spatial configuration.

\* \* \* \* \*